(12) United States Patent
Komsta et al.

(10) Patent No.: US 12,311,467 B2
(45) Date of Patent: May 27, 2025

(54) LASER CONTROL SYSTEMS FOR ADDITIVE MANUFACTURING

(71) Applicant: VulcanForms Inc., Devens, MA (US)

(72) Inventors: Jan Pawel Komsta, Northborough, MA (US); Alexander Dunbar, Watertown, MA (US); Matthew Sweetland, Bedford, MA (US)

(73) Assignee: VulcanForms Inc., Devens, MA (US)

( * ) Notice: Subject to any disclaimer, the term of this patent is extended or adjusted under 35 U.S.C. 154(b) by 0 days.

(21) Appl. No.: 18/433,377

(22) Filed: Feb. 5, 2024

(65) Prior Publication Data

US 2024/0173801 A1   May 30, 2024

Related U.S. Application Data

(62) Division of application No. 16/749,464, filed on Jan. 22, 2020, now Pat. No. 11,931,824.

(Continued)

(51) Int. Cl.
*B23K 26/342* (2014.01)
*B22F 10/36* (2021.01)
(Continued)

(52) U.S. Cl.
CPC ............ *B23K 26/342* (2015.10); *B22F 10/36* (2021.01); *B23K 26/03* (2013.01); *B23K 26/062* (2015.10);
(Continued)

(58) Field of Classification Search
CPC ...... B22F 10/36; B22F 2999/00; B23K 26/03; B23K 26/062; B23K 26/082;
(Continued)

(56) References Cited

U.S. PATENT DOCUMENTS

| 6,180,050 B1 | 1/2001 | Arai et al. |
| 7,528,344 B2 | 5/2009 | Horn et al. |

(Continued)

FOREIGN PATENT DOCUMENTS

| CN | 1501170 A | 6/2004 | |
| CN | 1501170 A1 * | 6/2004 | ............... G03F 7/20 |

(Continued)

OTHER PUBLICATIONS

Machine translation of CN 1501170 A1 performed on Oct. 4, 2024, Bleeker (Year: 2004).*

(Continued)

*Primary Examiner* — Dana Ross
*Assistant Examiner* — Kevin Guanhua Wen
(74) *Attorney, Agent, or Firm* — Wolf, Greenfield & Sacks, P.C.

(57) ABSTRACT

Laser control systems and related methods for controlling arrays of lasers are disclosed. A laser control system may include a first controller configured to generate a trigger signal based on a position of a laser array, and a second controller configured to send a firing signal to one or more lasers of the laser array upon receiving the trigger signal. The one or more lasers may be selected based on a desired pattern of laser energy to be formed at a particular position of the laser array.

19 Claims, 8 Drawing Sheets

Related U.S. Application Data

(60) Provisional application No. 62/795,693, filed on Jan. 23, 2019.

(51) Int. Cl.

| | | |
|---|---|---|
| *B23K 26/03* | (2006.01) | |
| *B23K 26/062* | (2014.01) | |
| *B23K 26/082* | (2014.01) | |
| *B33Y 10/00* | (2015.01) | |
| *B33Y 30/00* | (2015.01) | |
| *B33Y 50/02* | (2015.01) | |

(52) U.S. Cl.
CPC ............ *B23K 26/082* (2015.10); *B33Y 10/00* (2014.12); *B33Y 30/00* (2014.12); *B33Y 50/02* (2014.12)

(58) Field of Classification Search
CPC .. B23K 26/032; B23K 26/0604; B33Y 10/00; B33Y 30/00; B33Y 50/02; Y02P 10/25
See application file for complete search history.

(56) References Cited

U.S. PATENT DOCUMENTS

| | | | |
|---|---|---|---|
| 8,426,768 B2 | 4/2013 | Rekowski | |
| 9,956,612 B1 | 5/2018 | Redding et al. | |
| 10,022,795 B1 | 7/2018 | Redding et al. | |
| 2005/0157762 A1 | 7/2005 | DeMaria et al. | |
| 2011/0218695 A1 | 9/2011 | Goldman et al. | |
| 2014/0271328 A1* | 9/2014 | Burris et al. ............ | B22F 3/105 419/53 |
| 2016/0067920 A1* | 3/2016 | Fontaine ................. | B29C 67/00 |
| 2016/0158889 A1 | 6/2016 | Carter et al. | |
| 2016/0368050 A1 | 12/2016 | Morris et al. | |
| 2017/0021454 A1 | 1/2017 | Dallarosa et al. | |
| 2017/0021455 A1 | 1/2017 | Dallarosa et al. | |
| 2017/0056975 A1 | 3/2017 | Carter et al. | |
| 2017/0355147 A1 | 12/2017 | Buller et al. | |
| 2018/0111319 A1* | 4/2018 | Brezoczky et al. .... | B29C 64/35 |
| 2018/0186082 A1 | 7/2018 | Randhawa | |
| 2018/0200792 A1 | 7/2018 | Redding et al. | |
| 2018/0207722 A1 | 7/2018 | Feldmann et al. | |
| 2018/0229444 A1 | 8/2018 | Karp et al. | |
| 2018/0236549 A1 | 8/2018 | Spears et al. | |
| 2018/0297114 A1 | 10/2018 | Preston et al. | |
| 2018/0304538 A1 | 10/2018 | Ng et al. | |
| 2018/0304539 A1* | 10/2018 | Ng et al. ............... | B29C 64/393 |
| 2018/0370146 A1 | 12/2018 | Domröse et al. | |
| 2019/0143406 A1 | 5/2019 | Carter et al. | |
| 2019/0299286 A1 | 10/2019 | Feldmann et al. | |
| 2020/0039000 A1 | 2/2020 | Sweetland | |
| 2020/0108465 A1 | 4/2020 | Sweetland | |
| 2020/0230745 A1 | 7/2020 | Komsta et al. | |
| 2020/0376761 A1 | 12/2020 | Sweetland | |
| 2021/0339318 A1 | 11/2021 | Dunbar et al. | |
| 2022/0009030 A1 | 1/2022 | Dadelszen et al. | |
| 2023/0056367 A1 | 2/2023 | Leonardo et al. | |

FOREIGN PATENT DOCUMENTS

| | | | | |
|---|---|---|---|---|
| CN | 106964900 A | 7/2017 | | |
| CN | 107635749 A | 1/2018 | | |
| CN | 107791521 A | 3/2018 | | |
| GB | 2 533 287 A | 6/2016 | | |
| GB | 2533287 A1 * | 6/2016 | ............... | B41C 1/05 |
| JP | 2006-290588 A | 10/2006 | | |
| JP | 2011-215275 A | 10/2011 | | |
| WO | WO 2017/060793 A1 | 4/2017 | | |
| WO | WO 2017/187147 A1 | 11/2017 | | |
| WO | WO 2019/191585 A1 | 10/2019 | | |

OTHER PUBLICATIONS

International Search Report and Written Opinion for International Application No. PCT/US2020/014582, mailed Apr. 9, 2020.
Extended European Search Report dated May 1, 2023 in connection with European Application No. 20744301.1.

\* cited by examiner

| Laser Pixel | Laser Trigger Position Lists | Laser Firing States |
|---|---|---|
| L1 | {$P_{11}, P_{12}$} | {On, Off} |
| L2 | {$P_{21}, P_{22}, P_{23}, P_{24}$} | {On, Off, On, Off} |
| L3 | {$P_{31}, P_{32}, P_{33}, P_{34}$} | {On, Off, On, Off} |
| L4 | {$P_{41}, P_{42}, P_{43}, P_{44}$} | {On, Off, On, Off} |
| L5 | {$P_{51}, P_{52}$} | {On, Off} |

LASER CONTROL SYSTEMS FOR ADDITIVE MANUFACTURING

RELATED APPLICATIONS

This patent is a divisional of U.S. patent application Ser. No. 16/749,464, filed Jan. 22, 2020, which claims priority under 35 U.S.C. § 119(e) to U.S. Provisional Patent Application No. 62/795,693, filed Jan. 23, 2019, each of which is hereby incorporated by reference in their entireties.

FIELD

Disclosed embodiments are related to laser control systems and related methods. Some embodiments relate to laser control systems for additive manufacturing systems.

BACKGROUND

Powder bed fusion processes are an example of additive manufacturing processes in which a three-dimensional shape is formed by selectively joining material in a layer-by-layer process. In metal powder bed fusion processes, one or multiple laser beams are scanned over a thin layer of metal powder. If the various laser parameters, such as laser power, laser spot size, and/or laser scanning speed are in a regime in which the delivered energy is sufficient to melt the particles of metal powder, one or more melt pools may be established on a build surface. The laser beams are scanned along predefined trajectories such that solidified melt pool tracks create shapes corresponding to a two-dimensional slice of a three-dimensional printed part. After completion of a layer, the powder surface is indexed by a defined distance, the next layer of powder is spread onto the build surface, and the laser scanning process is repeated. In many applications, the layer thickness and laser power density may be set to provide partial re-melting of an underlying layer and fusion of consecutive layers. The layer indexing and scanning is repeated multiple times until a desired three-dimensional shape is fabricated.

Both single laser and multi-laser systems are used. Some systems use a pair of galvanometer mounted mirrors to scan each laser beam over the desired pattern on the build surface. Some systems use motion stages to scan the laser over the build surface. Some systems use a combination of motion stages and galvanometers to scan the laser over the build surface. Systems that use galvanometers as part of the scanning method often use f-theta or telecentric lens to help keep the incident angle of the laser beam onto the build surface as close to perpendicular as possible for a given build surface size. The spacing between the final optical component of any laser path (e.g., final optics, galvanometer, mirror, telecentric lens or f-theta lens) may be on the order of a few millimeters up to a hundred or more centimeters.

SUMMARY

In one embodiment, a laser control system for controlling a laser array comprises a position sensor configured to detect a position of a laser array and generate a position signal. The laser array comprises a plurality of laser sources. The laser control system further comprises a controller configured to trigger one or more laser energy sources of the plurality of laser energy sources based on the position signal.

In certain embodiments of the laser control system, the controller comprises a first controller operatively coupled to the position sensor. The first controller is configured to receive the position signal, compare the position signal to a list of laser trigger positions, and generate a trigger signal based on the comparison of the position signal to the list of laser trigger positions. The controller also comprises a second controller operatively coupled to the first controller and to the plurality of laser sources. The second controller is configured to receive the trigger signal and send a firing signal to a subset of laser sources of the plurality of laser sources of upon receiving the trigger signal.

In another embodiment, a method of controlling a laser array comprises determining a position of a laser array, the laser array comprising a plurality of laser energy sources, and selectively controlling the operation of the one or more laser energy sources based on the position of the laser array.

In some embodiments of the method, determining the position of the laser array comprises receiving a position signal with a first controller. Moreover, selectively controlling the one or more laser energy sources comprises comparing the position signal to a list of laser trigger positions, generating a trigger signal based on the comparison of the position signal to the list of laser trigger positions, receiving the trigger signal with a second controller, and sending a firing signal to a subset of laser sources of the plurality of laser sources upon receiving the trigger signal.

In a further embodiment, an additive manufacturing system comprises a build surface, a plurality of laser energy sources, and an optics assembly movable relative to the build surface and configured to direct laser energy from the plurality of laser energy sources towards the build surface to form an array of laser energy pixels on the build surface. A relative position of each laser energy pixel in the array is fixed. The system further comprises a position sensor configured to detect a position of the optics assembly and a laser control system. The laser control system comprises a first controller configured to receive a position signal from the position sensor and generate a trigger signal based on the position signal, and a second controller configured to receive the trigger signal and send a firing signal a subset of the plurality of laser energy sources to selectively activate a subset of the array of laser energy pixels upon receiving the trigger signal.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

In cases where the present specification and a document incorporated by reference include conflicting and/or inconsistent disclosure, the present specification shall control. If two or more documents incorporated by reference include conflicting and/or inconsistent disclosure with respect to each other, then the document having the later effective date shall control.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1:
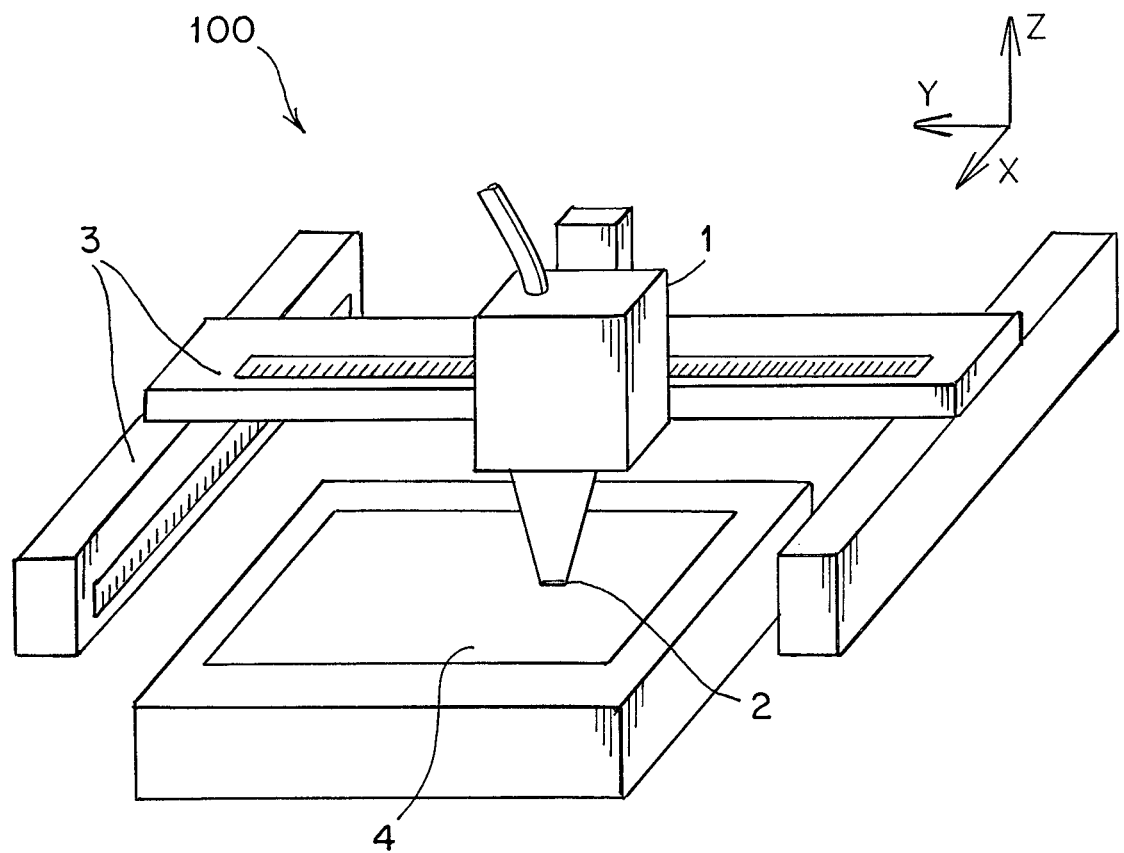
FIG. 1 is a schematic representation of an additive manufacturing system, according to some embodiments.

In some additive manufacturing systems utilizing laser energy sources, such as metal powder bed fusion systems, the additive manufacturing process is controlled by selectively supplying laser power to the metal powder to produce solid metal where desired, and to leave the remaining powder unmelted. The inventors have appreciated that complexity in these systems may arise from the multiple parameters that can be selected and the highly nonlinear interaction those parameters have on the additive manufacturing process. Process parameters that are often important include, but are not limited to, the laser power, the laser spot size and shape, laser power distribution, laser scanning velocity (i.e., a speed of the laser spot on the powder-bed along a scanning direction), hatching distance (i.e., a distance between subsequent scans) and the powder layer thickness. Some parameters, such as laser power and scan speed can be adjusted quickly, such as many times within a manufacturing process for a single part, whereas other parameters such as laser spot size and power distribution may be set for a specific additive manufacturing system. For a given powder size and material, these process parameters are selected so that a stable melt-pool is achieved during the additive manufacturing process, and the final manufactured part is fully or nearly fully dense.

In some applications, the maximum rate of an additive manufacturing process is limited by the amount of the energy that can be delivered by an individual laser spot while still maintaining a stable melt pool. In particular, for a given material, there typically exists a narrow processing window where the melt pool remains stable; the processing window may be defined as the laser power per unit area, or equivalently, as the laser energy per unit area per unit time. Some of the primary process parameters that affect this processing window include the laser power and laser scan speed. For instance, increasing the laser power per area (e.g., by increasing the laser power or decreasing the scan speed) may lead to abrupt vaporization of the metal in a melt pool, leading to key-hole formation (which may result from excessive evaporation of a molten melt pool) and/or surface deformations. Such excessive evaporation can lead to creation of a deeper melt pool and voids in a manufactured part, which may result in undesirable high porosity. Conversely, decreasing the power per unit area (e.g., by decreasing the laser power or increasing the scan speed) may lead to incomplete fusion, resulting in formation of voids of unmelted powder or separation of the layers. In some instances, an upper limit for increasing the scanning speed and laser power is defined by a point at which the melt pool forms discontinuous droplets due to Rayleigh instability, which may be referred to as "balling".

In view of these limitations on the process parameters, the inventors have appreciated that conventional powder bed fusion systems are often limited in the power per unit area that they can deliver (and thus limited in the rate of the powder bed fusion process), while still maintaining high part quality. Accordingly, the inventors have recognized and appreciated numerous advantages associated with powder bed fusion systems utilizing multiple laser energy sources to increase the total power delivered to the powder bed while not increasing the powder per unit area. Moreover, multiple laser powder bed fusion systems may provide this increased power while maintaining small laser spot sizes for the individual lasers, thereby maintaining high resolution (associated with the ability to print smaller part features) as the total power is increased.

However, the inventors have further appreciated numerous drawbacks associated with current approaches to multiple-laser powder bed fusion systems. For example, the laser actuation and control systems utilized in many conventional powder bed fusion systems are based on galvo-scanners, which consist of a pair of galvanometer mounted mirrors. These systems often include f-theta or telecentric lens to aid in maintaining the incident angle of the laser beam onto a build surface as close to perpendicular as possible for a given build surface size, and some systems may use optomechanical autofocus mechanism to ensure a consistent spot size over a scanned area. Notably, though, the size of the galvo-scanner assembly with an f-theta, telecentric lens, and/or autofocus system limits the maximum number of lasers that are used, and consequently, many conventional systems are limited to between one and four lasers.

Additionally, in existing multi-laser systems in which each laser has an associated galvo-scanner, the control of the laser spot positions is typically executed by individual amplifier cards. In particular, the lasers are synchronized using higher-level software by splitting and assigning desired trajectories and firing instances to the amplifier of each individual galvo-scanner. The inventors have recognized that the complexity level of this control approach and associated machine architecture grows with the number of lasers, and consequently, the computational and hardware costs increase with an increasing number of lasers. Additionally, controlling the interactions between melt-pools generated by the individual lasers and compensating for geometrical inaccuracies of individual galvo-scanners can become a challenging problem when increasing the number of lasers, and errors may arise due to misalignment of overlapping galvo-scanners.

Moreover, the inventors have appreciated that existing control solutions may not be suitable for systems utilizing substantially more than four lasers. In particular, the hardware architecture of existing systems is not well suited for synchronized control of multiple independent lasers as the number of laser sources is increased, for example, to more than four lasers.

In view of the foregoing, the inventors have recognized and appreciated numerous benefits associated with scalable laser control systems that can provide synchronized control of a large number of independent lasers, such as in a laser array. For example, the systems and methods described herein may provide scalable control of multi-laser powder bed fusion systems, including systems configured for use with a large number of independent laser sources (e.g., 1000 or more independent lasers).

According to some aspects, a plurality of independent lasers may be arranged in an array such that the relative position of each laser in the array is fixed, and the array may have any suitable shape (e.g., a line, a rectangular array, a circular array, a two-dimensional array having an irregular shape, and/or any repeating pattern of a shape). In this manner, the position of each laser in the array may be determined based on the position of the array (which may be measured using one or more position sensors such as optical, magnetic, capacitive, and/or inductive encoders, or estimated based on position profile for the array and a timing measurement) along with the specific fixed geometry of the array, and consequently, the individual lasers in the array may be controlled based on the position of the laser array. The inventors have recognized and appreciated that such arrangements may provide substantially reduced complexity in controlling a laser pattern on a build surface during an additive manufacturing process, and may permit control of the large number of lasers based on a small number of degrees of freedom. For example, in a system comprising a laser array of N lasers, the laser array may be controlled based on a few degrees of freedom (e.g., between one and three degrees of freedom) corresponding position feedback devices associated with movement of the laser array relative to the build surface. For instance, a laser array movable along three directions (e.g., three translational directions, and/or a combination of translational and rotational directions) may be controlled based on three degrees of freedom. In contrast, a system utilizing galvo-scanners to control the N lasers would require controlling the lasers based on N or more separate degrees of freedom, which would significantly increasing the control complexity as the number of lasers is increased.

In some embodiments, a laser control system may be configured to control a plurality of independent lasers in a laser array based on one or more matrices of laser firing states. For example, a matrix may have dimensions of N×M, where N is the number of lasers in the array (or a number of independently controllable groups of lasers) and M is a number of unique firing events. Depending on the particular embodiment, the number M of unique firing events may vary between passes of the laser array in an additive manufacturing process, and thus, while the number of lasers N typically remains fixed throughout the additive manufacturing process, different matrices of laser firing states for different passes may have different dimensions based on a different numbers M of firing events for different passes. In certain embodiments, a single matrix N×M matrix may include firing events corresponding to multiple passes, such as up to all of the passes of an additive manufacturing process.

In some embodiments, the firing events of a matrix of firing states may correspond to positions of the laser array, such as along a build surface during an additive manufacturing process. For instance, the positions may correspond to positions within a two-dimensional plane corresponding to a single layer of a part and/or in a third dimension (e.g., a vertical direction) corresponding to different layers of the part. Each value in the firing state matrix may provide a firing state for a particular laser in the array at a particular firing event. For example, in some embodiments, the firing states may correspond to a power setting of each laser (e.g., on/off, and/or a sequence of laser on/off pulses) at a particular location on a build surface such that the laser array forms a desired pattern of laser energy on the build surface corresponding to a geometry of a part to be manufactured. In some embodiments, the power setting may correspond to a pulse width modulation setting, an on/off setting, an on time setting, and/or an analog power level. As described in more detail below, the laser control system may determine the current firing event (e.g., based on a position of the laser array as it is moved along the build surface during an additive manufacturing process) and the states of all of the lasers in the array may changed synchronously to the states corresponding to the current firing event. Moreover, in some applications, the N×M matrix or matrices may be applied repeatedly for each scanning trajectory (e.g., scanning pass) across various regions of a part until a particular layer of the part is fully scanned.

According to some aspects, systems in which unique firing events correspond to positions of the laser array, one or more position sensors may be used to detect a position of the laser array. In some embodiments, the position sensors may include one or more encoders of actuators that are used to move the laser array along different directions. For example, a laser array in an additive manufacturing system (e.g., a powder bed fusion system) may be moveable along three orthogonal axes; two axes may be parallel to the build surface to allow the laser array to move along the powder bed when forming individual layers of a part, and a third orthogonal axis for vertical movement of the laser array relative to the build surface (e.g., when the build surface is indexed downwardly to form a subsequent layer of a part). In some embodiments, one or more encoder signals may be compared in real time to a list of laser trigger positions corresponding to unique firing events for the laser array, and if the laser array moves within a position window corresponding to a laser trigger position, one or more of the lasers in the array may transition to a new state according to a value in a firing state array corresponding to the particular laser trigger position. For example, the encoder signal may be split and transmitted to multiple laser control modules, and each module may be configured to perform the above described comparison of the encoder signal to the list of laser trigger positions and selectively activate a subset of the lasers in the laser array based on a laser pattern corresponding to firing states in the firing state matrix.

It should be appreciated that the current disclosure is not limited to any particular sensors or methods for determining a position of a laser array and/or generating a position signal. In particular, while the above described embodiments utilize an encoder that generates an associated encoder signal, other arrangements may be suitable. For example, in some embodiments, a position of a laser array may be estimated based on a predetermined position profile and a timing signal. For instances, the timing signal may be used to determine a time value, and the time value may be referenced to positions of the laser array associated with the position profile to estimate the position of the laser array.

While the above-described laser control approach may be suitable to perform synchronous control for systems comprising multiple lasers (e.g., up to about 10-20 independent lasers), the inventors have recognized and appreciated that as the number of lasers is further increased, additional splitting of the high speed position signals may lead to undesirable degradation of the signals, such as due to damping, noise, or delays in the transmission of the split signal. Such degradation of the encoder signal may lead to errors in a manufacturing process, for example, due to firing of one or more of the lasers in the array at incorrect positions. Accordingly, some aspects described herein provide for scalability of the laser control systems to permit synchronized, position-based control of a large number of independent lasers without requiring splitting of an encoder signal, or by splitting the encoder signal a limited number of times to maintain the signal quality of the encoder signal.

In some embodiments, a laser control system may include a first controller and a second controller. The first controller may be configured to receive one or more position signals from position sensors (e.g., encoder signals from actuators) that are configured to detect a position of a laser array, such as a position relative to a build surface in a powder bed fusion process. Upon receiving the position signal, the first controller may compare the position signal to a list of laser trigger positions. As discussed above, the list of laser trigger positions may contain a list of positions corresponding to a set of firing events in a laser firing state matrix. If the first control determines that the current position of the laser array corresponds to a laser trigger position from the list of laser trigger positions, the first controller may generate a trigger signal (e.g., a triggering pulse) that is transmitted to the second controller. The second controller may be coupled to the plurality of lasers comprising the laser array, and upon receiving the trigger signal from the first controller, the second control may send a firing single to one or more of the lasers. For example, the second controller may send the firing signal to a subset of the plurality of lasers selected based on a set of laser firing states corresponding to the particular laser trigger position. In this manner, such systems may utilize a single high frequency encoder signal (or a small number of encoder signals), that is incapable of being split to every laser within the laser array, to provide closed-loop, deterministic control of each laser in the laser array based on the position of the laser array. In particular, the high frequency encoder signal may be converted to a lower frequency series of trigger signals, which can be more readily split as needed. Depending on the particular embodiment, the encoder signal may have a frequency of between about 1 MHz and about 50 MHz, and the trigger signal may have a frequency of between 1 Hz and about 1 MHz.

In some embodiments, the first controller may include a first memory configured to store the list of laser trigger positions, and the second controller may include a second memory configured to store a matrix of laser firing states. The list of laser trigger positions and the matrix of laser firing states may be sorted such that the first laser trigger position in the list of laser trigger positions corresponds to a first set of laser firing events in the matrix of laser firing events. For example, the matrix of laser firing events may be organized such that each column in the matrix corresponds to a laser trigger position, and each row corresponds to the firing state of each laser at each laser trigger position. Accordingly, each column of values in the matrix may define a laser pattern for the laser array at each laser trigger position. By sorting the list of laser trigger positions and the matrix of laser firing states, the first and second controllers may proceed sequentially through the laser trigger positions and the laser patterns at each laser trigger position throughout a process. For example, after receiving a trigger signal from the first controller, the second controller may send a firing signal to a subset of lasers in the laser array corresponding to the laser pattern at the current laser trigger position, and subsequently, the second controller may transition to the next laser pattern in the matrix and await the next trigger signal from the first controller.

In some embodiments, a first memory of the first controller may be configured to store a plurality of lists of laser trigger positions, wherein each list contains the trigger positions associated with firing events for each laser (or group of lasers) of a laser array. In such embodiments, the first controller may include a plurality of comparator modules configured to compare an encoder signal (or other suitable position signal) to each list of laser trigger positions, and each comparator module may send separate trigger signals to a plurality of second controllers coupled to individual lasers (or groups of lasers) of the laser array. The plurality of second controllers may be configured to send firing signals to each of the lasers upon receiving the individual trigger signals in accordance with a list of laser firing states for each laser. In particular, each of the second controllers may have a second memory containing a list of laser firing states for its associated laser, and the second controllers may step through their lists of laser firing states upon receipt of the individual trigger signals. In this manner, such embodiments may not require the use of a combined firing state matrix, such as those discussed above.

In certain embodiments, each of the first and second controllers employed in a laser control system may comprise high speed field programmable gate arrays (FPGAs), which, coupled with the high positional accuracy associated with actuators such as servomotors and their associated encoder signals, may allow for control of a laser array with both high positional accuracy and high speed. For example, in some embodiments, the laser array may be controlled with a positional accuracy of 5 micrometers or less, and a delay of less than 5 microseconds between the trigger signal and activation of a laser pattern. Moreover, depending on the particular embodiment, the firing of each laser in an array may be operated in a continuous mode (i.e., toggling between an on state and an off state), and/or in a pulsing mode. In a pulsing mode, the firing signal from the second controller may operate in a pulse-width-modulated mode to allow variation of the power level supplied by each laser (e.g., to a power level between 0% and 100% of the maximum power for each laser).

According to some aspects, a laser control system may include a communication bus configured to transmit the position signals and/or trigger signals between a position sensor, first controller, and/or second controller, and the communication bus and controllers may introduce a communication delay time, such that the actual position of a laser array may be offset from a position signal value by the time the signal is received by the first controller and/or by the time a trigger signal is generated and received by the second controller. The inventors have recognized and appreciated that if the delay time is stable throughout a given process, the delay can be compensated by offsetting the position values in a list of laser trigger positions by a position offset defined as the product of the velocity of the laser array along a processing vector and the delay time of the communication bus and controllers.

In some applications, for example, in systems employing a large number of lasers in a laser array, a trigger signal generated by a first controller may be split and transmitted to a plurality of second controllers that are each configured to control a subset of the lasers in the laser array. As noted above, compared to a high frequency encoder signal, which may degrade if split too many times, the lower frequency trigger signal may be capable of being split multiple times without significant degradation. Moreover, in some embodiments (e.g., as the system size is further increased), the encoder signal may be split a small number of times (e.g., less than 15 times, less than 10 times, or less than 5 times), and the split encoder signal may be transmitted to a plurality of first controllers configured to generate a plurality of triggering signals, which in turn, are received by a plurality of second controllers configured to control firing of the lasers in the laser array. Without wishing to be bound by theory, these arrangements in which the trigger signal and/or encoder signal is split among a plurality of second controllers and/or first controllers, respectively, may reduce a computation load on each of the controllers and allow for a higher processing rate and/or more synchronous system control.

In some embodiments, desired motion trajectories for a laser array and laser trigger positions along the motion trajectories may be generated and optimized prior to a process, such as a powder bed fusion process. In one embodiment, a predefined pattern of parallel scanning lines is superimposed on each layer of a sliced three-dimensional model of a part. Each line of this pattern may correspond to a motion path of a single laser pixel of the laser array, and the laser pattern may be defined by the laser array dimensions and pixel size formed by each laser spot on the build surface. The laser trigger positions for each laser are determined by intersection of the pixels and the sliced geometry. In some instances, a scanning pattern mask (e.g., a checkerboard pattern) can be overlaid onto the part geometry to further modify the laser firing events. Some scanning strategies may employ multiple passes of the array over the same region, using the same or different toggling sequence of the pixels at each pass. Each scanning region may have a unique laser power setting, or if the lasers are operated in a pulsing mode, each laser may be assigned a specific pulsing frequency and pulse fill ratio. Moreover, in some embodiments, a size of the laser array may be smaller than an area to be scanned, and thus multiple passes may be employed to expose the entire scan area to a desired pattern of laser energy.

In one exemplary embodiment, the laser array motion may be linear, however other scanning trajectories, such as trajectories along curves or in any suitable shape may be suitable. While such trajectories may increase the complexity of calculating the motion trajectories and laser firing position points, they may allow for more efficient scanning for some part geometries.

While some embodiments described above utilize position-based feedback to control firing of the lasers in a laser array, it should be understood that other type of feedback or other controlling signals may be suitable. For example, in some embodiments, a laser control system may utilize an estimated position signal and/or a timing based signal. In particular, a first controller may be configured to receive a timing signal (e.g., a clock signal from a processor) and the first controller may be configured to generate series of trigger pulses based on a comparison of the timing signal to a list of laser trigger times. For instance, the laser trigger times may be selected based on predicted positions of the laser array as the array moves according to a predetermined scanning trajectory. The inventors have recognized and appreciated that such arrangements may allow for control of the laser array without requiring separate position sensors such as encoders, which may allow for reductions in the cost and complexity of the laser control system.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 depicts one embodiment of an additive manufacturing system 100 (e.g., a powder bed fusion system) that may utilize the laser control systems and methods described herein. The system includes an optics unit 1 configured to direct laser energy 2 towards a build surface 4. The laser energy may be generated by a plurality of laser energy sources and delivered to the optics unit 1 via a plurality of optical fibers, and the optics unit may include one or more optical elements configured to form a desired pattern of laser energy on the build surface. Exemplary configurations of such optical elements are described in U.S. patent application Ser. No. 15/940,315, which is incorporated herein by reference in its entirety. During an additive manufacturing process, the optics head 1 may be moved relative to the build surface via a gantry system 3 to deliver a desired pattern of laser energy onto the build surface according to a desired part geometry. As illustrated, the gantry system may be configured to move the optics unit 1 along multiple directions relative to the build surface, such as along orthogonal directions X and Y that are parallel to the build surface. Depending on the particular, embodiment, the gantry system 3 may include any suitable actuators to move optics unit, such as one or more servo motors having associated position transducers to detect a position of the optics unit relative to the build surface 4. Suitable position transducers include, but are not limited to, absolute or incremental encoders, such as optical, magnetic, capacitive, and inductive encoders.

Figure 2:
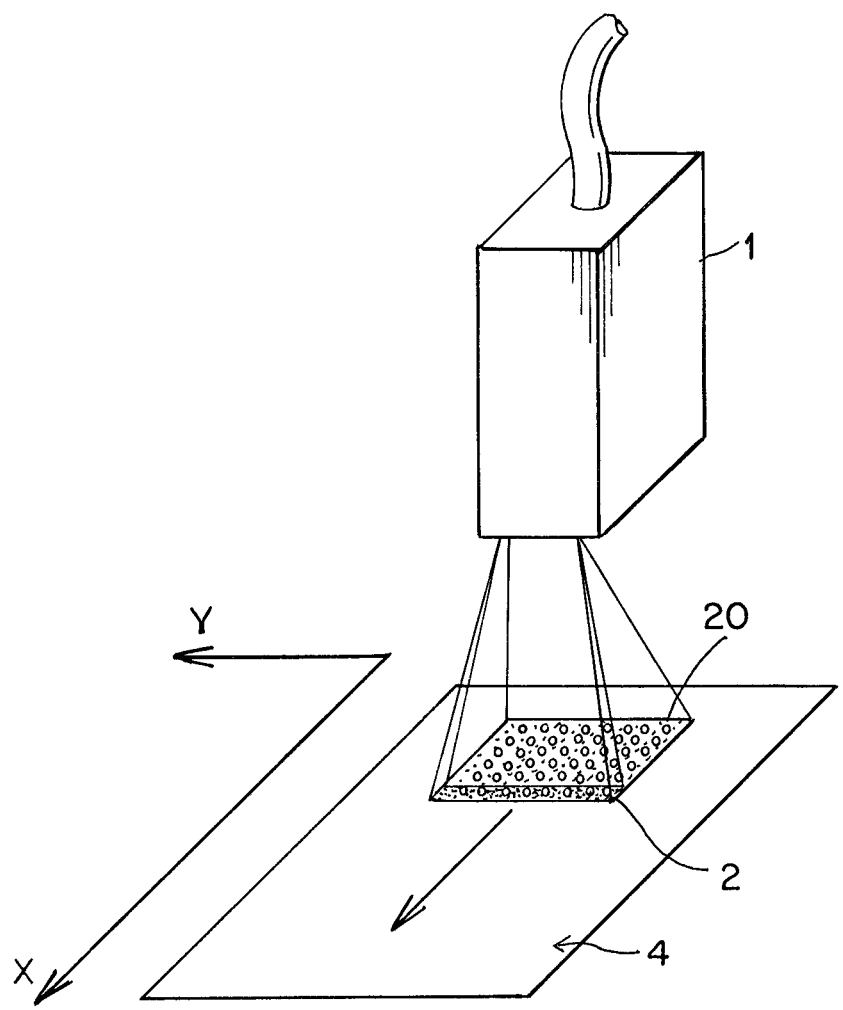
FIG. 2 is schematic representation of a portion of the additive manufacturing system of FIG. 1.
Figure 3:
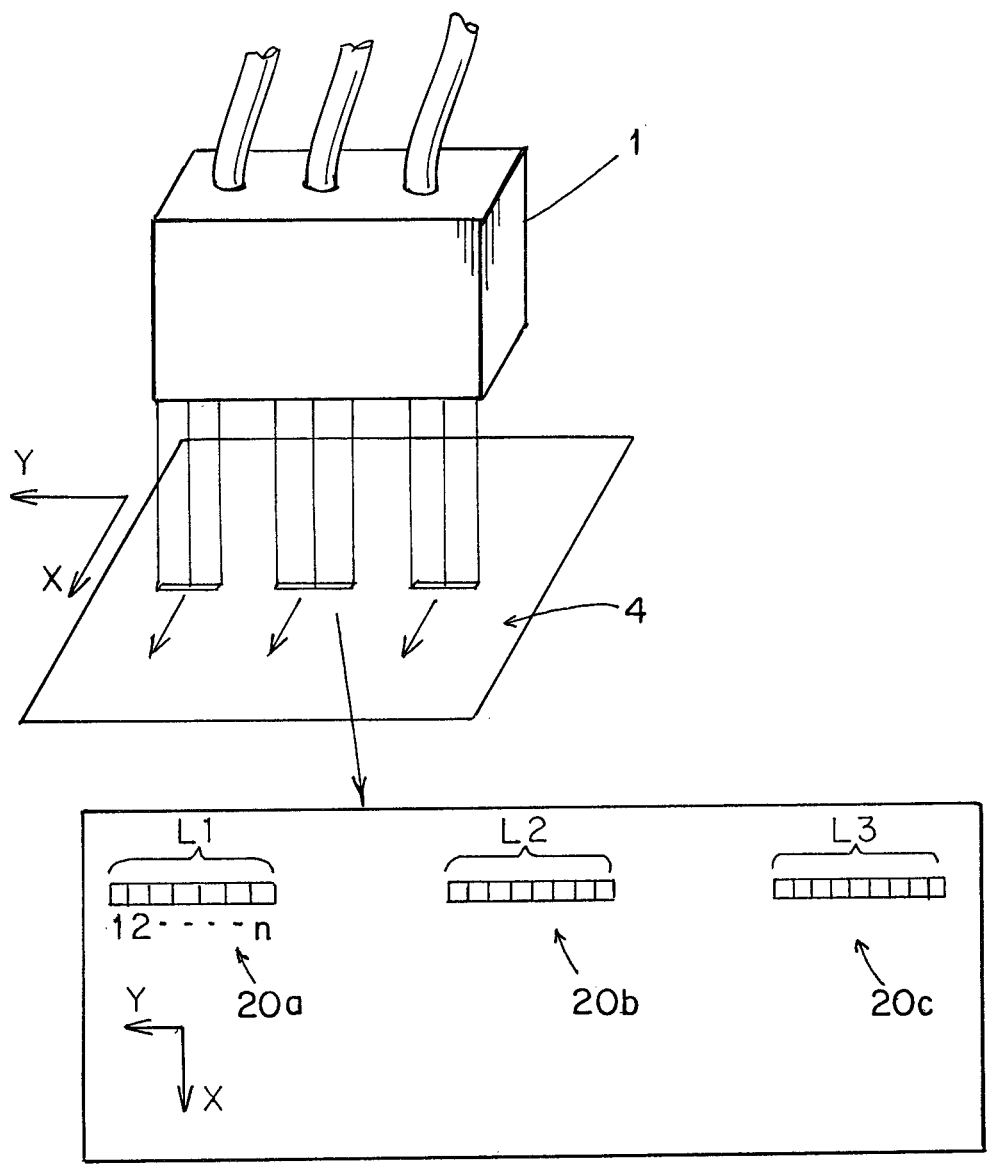
FIG. 3 is a schematic representation of an optics assembly and arrays of laser energy on a build surface, according to some embodiments.

As illustrated in FIG. 2, the optics unit 1 may be constructed and arranged such that the laser energy 2 forms an array of laser energy pixels 20 on the build surface such that a relative position of each laser energy pixel in the array remains fixed. As discussed above, such configurations may permit an array 20 containing a large number of individual laser energy pixels to be controlled based on a small number of degrees of freedom, for example corresponding to the position of the optics unit 1. While the laser energy array 20 shown in FIG. 2 has a rectangular configuration of laser energy pixels, it should be understood that the current disclosure is not limited to any particular shape for the array 20. For example, the array could be a one-dimensional line, a square array, a circular array, or an array having any other suitable shape, including an irregular shape. Moreover, as shown in FIG. 3, in some embodiments, the optics unit 1 may be configured to form multiple arrays of laser energy on a build surface. In particular, in the embodiment shown in FIG. 3, the optics unit is configured to form three lines of laser energy pixels 20a, 20b, and 20c on the build surface 4.

Figure 4:
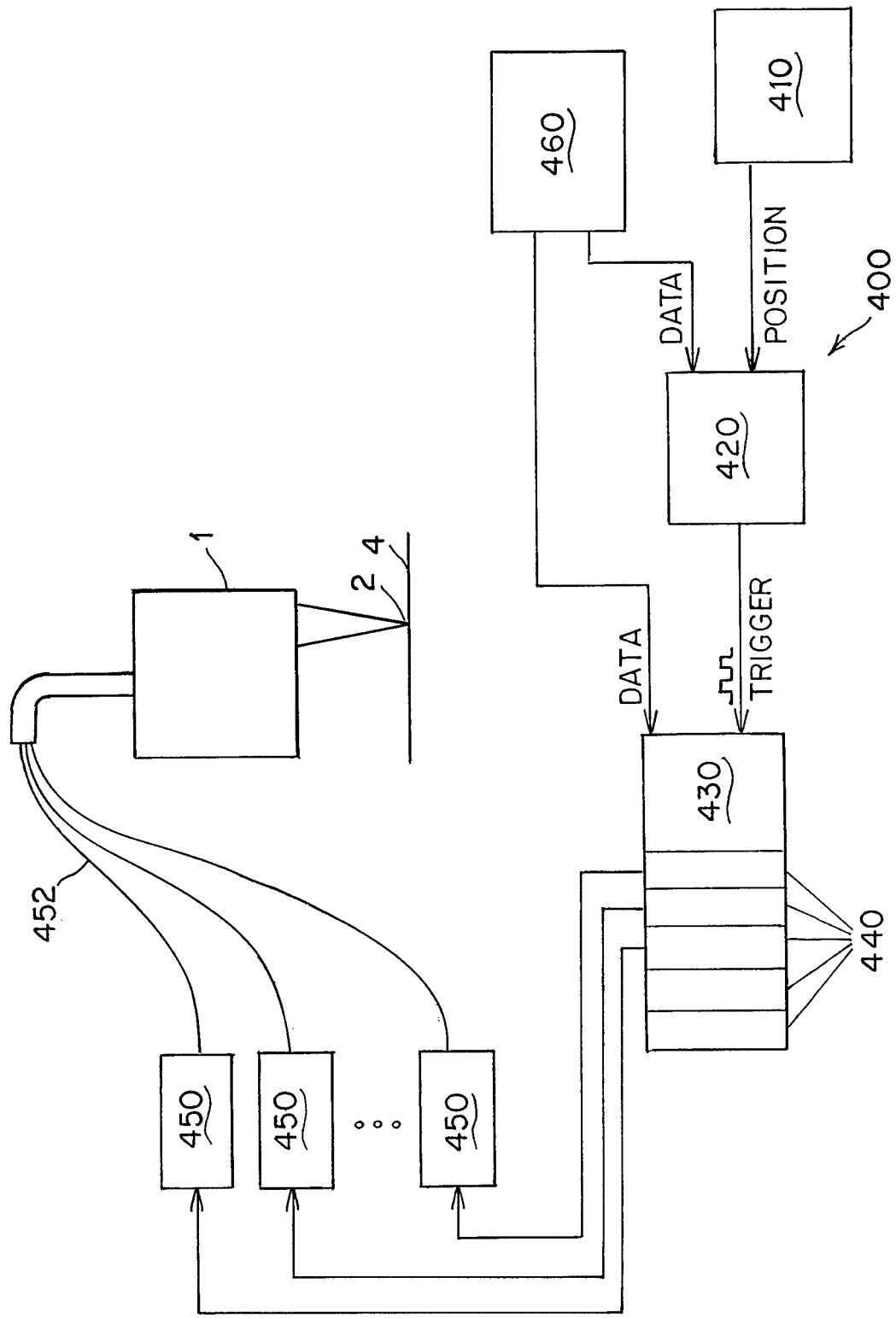
FIG. 4 is a schematic representation of a laser control system, according to some embodiments.

FIG. 4 is a schematic representation of one embodiment of a control system 400 that may be used to control an array of laser energy pixels (i.e., a laser array) in an additive manufacturing system, such as the system 100 described above in connection with FIG. 1. The control system includes a first controller 420 is configured to receive one or more position signals from one or more position sensors 410 that are configured to detect a position of the laser array (e.g., based on a position of optics unit 1). As discussed above, the relative position of each laser energy pixel in the array may be fixed such that the position of the array, along with the geometry of the array, is sufficient to define the position of each laser in the array. The first controller 420 is further configured to generate a trigger signal based on the position signal. For example, as described above and in more detail below, the first controller may compare the position signal to a list of laser trigger positions, and if the first controller determines that the laser array is at a position corresponding to a position in the list of laser trigger positions, the first controller may generate a trigger signal (e.g., a triggering pulse signal) that is transmitted to a second controller 430. Upon receiving the trigger signal, the second controller 430 may send a firing signal to a plurality of laser energy sources 450 via a plurality of outputs 440 (e.g., digital outputs) associated with the second controller 430. The firing signals may be based on a desired laser pattern corresponding to the position of the optics unit 1. In the depicted embodiment, each laser energy source 450 is coupled to the optical head 1 via an optical cable (e.g., a fiber optical cable) such that the laser energy may be transmitted to the optics unit 1, where the laser energy may be focused and/or directed into a plurality of laser energy pixels on the build surface 4.

Figure 5:
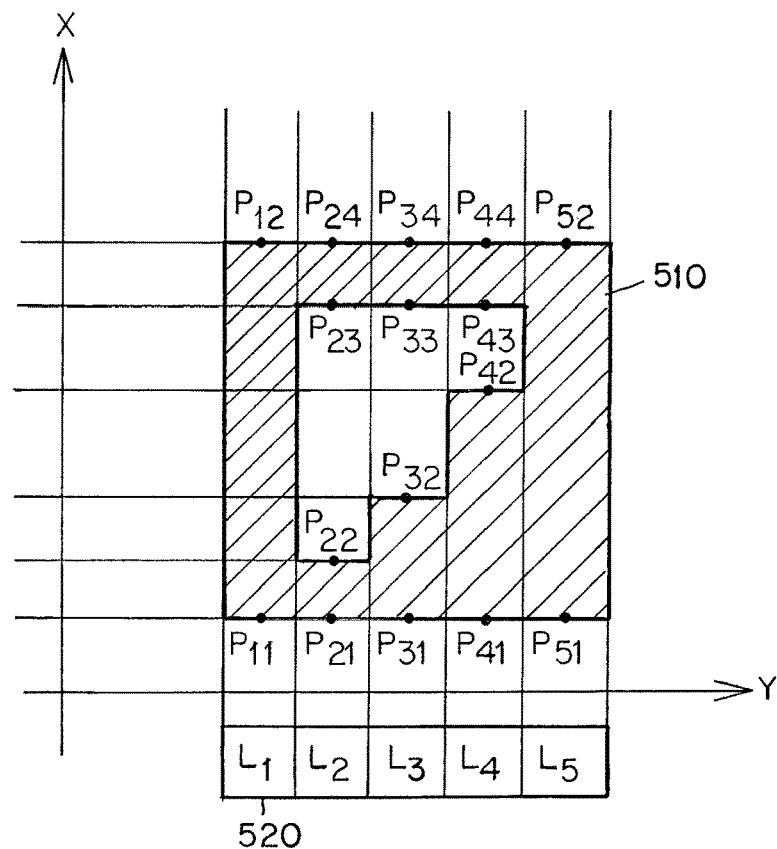
FIG. 5 is a schematic representation of a pattern of laser energy and an associated table of laser trigger positions and laser firing states, according to some embodiments.
Figure 6:
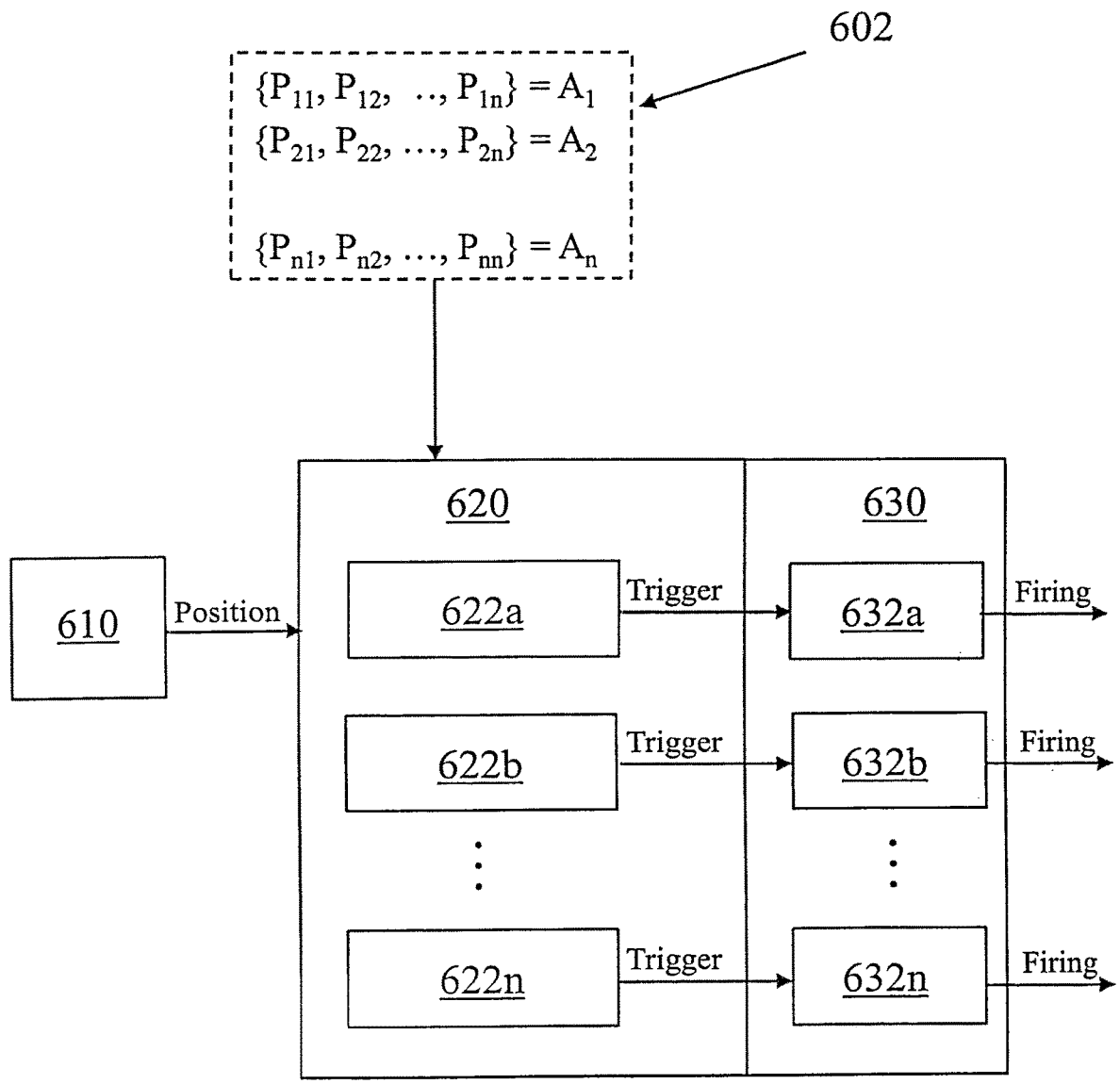
FIG. 6 is a schematic representation of a laser control system, according to some embodiments.

Referring now to FIGS. 5 and 6, one embodiment of a laser control system is described in more detail. As shown in FIG. 5, a pattern of laser energy 510 formed by an array of laser pixels 520 may be defined by a discrete set of laser trigger positions and laser firing states as shown in table 530. In particular, each laser pixel may have its own list of laser trigger positions that define positions at which a state of the laser pixel changes (e.g., from on to off or from off to on). Accordingly, depending on the particular pattern 510, the various laser pixels 520 may have lists of laser trigger positions that have different lengths over a common total displacement of the array of laser pixels 520 (e.g., as the laser array 520 is moved along the x axis). For example, as shown in FIG. 5, laser pixel L1 changes states at only two positions ($P_{11}$ and $P_{12}$) when forming pattern 510, while laser pixel L2 changes states at four positions ($P_{21}$, $P_{22}$, $P_{23}$, and $P_{24}$) over the same range of movement for the array 520. While five laser pixels arranged in a line are shown in FIG. 5, it should be understood that other arrangements may be suitable, such as with more or fewer lasers and/or in different configurations, as discussed above. While the laser firing states shown in FIG. 5 are depicted as on/off states, it should be understood that other firing states may be suitable, as the current disclosure is not limited in this regard. For example, other suitable firing state values may include, but are not limited to, power settings, such as analog power, pulse width modulation, and/or on time.

As shown in FIG. 6, a first controller 620 may receive a position signal (e.g., an encoder signal) from one or more position sensors 610, as well as a data set 602 containing the lists of laser trigger positions. For example, each laser in a laser array containing n lasers may have an associated list A that includes the laser trigger positions for each particular laser. Accordingly, the data set 602 may contain n lists ($A_1$ through $A_n$). In some embodiments, the data set 602 may be stored on a memory of the first controller 620. The first controller 620 may include a plurality of comparator modules 622a ... 622n corresponding to the number of lists in the data set, and each comparator module may be configured to compare the position signal to one list of laser trigger positions from the data set. For example, the first comparator module 622a may compare the position signal to the first list $A_1$, the second comparator module 622b may compare the position signal to the second list $A_2$, and so on. When any comparator module determines that the position signal corresponds to a laser trigger position in its list, it may generate and send a trigger signal to an associated output 632 of a second controller 630. Upon receiving the trigger signal, the output may generate and send a firing signal to an associated laser energy source, for example to toggle a state of the laser energy source (e.g., between an off and on state) to form a desired pattern (such as pattern 510 shown in FIG. 5). In this manner, the first controller may generate a plurality of independent trigger signals to independently control the firing states of each of the laser energy sources.

Figure 7:
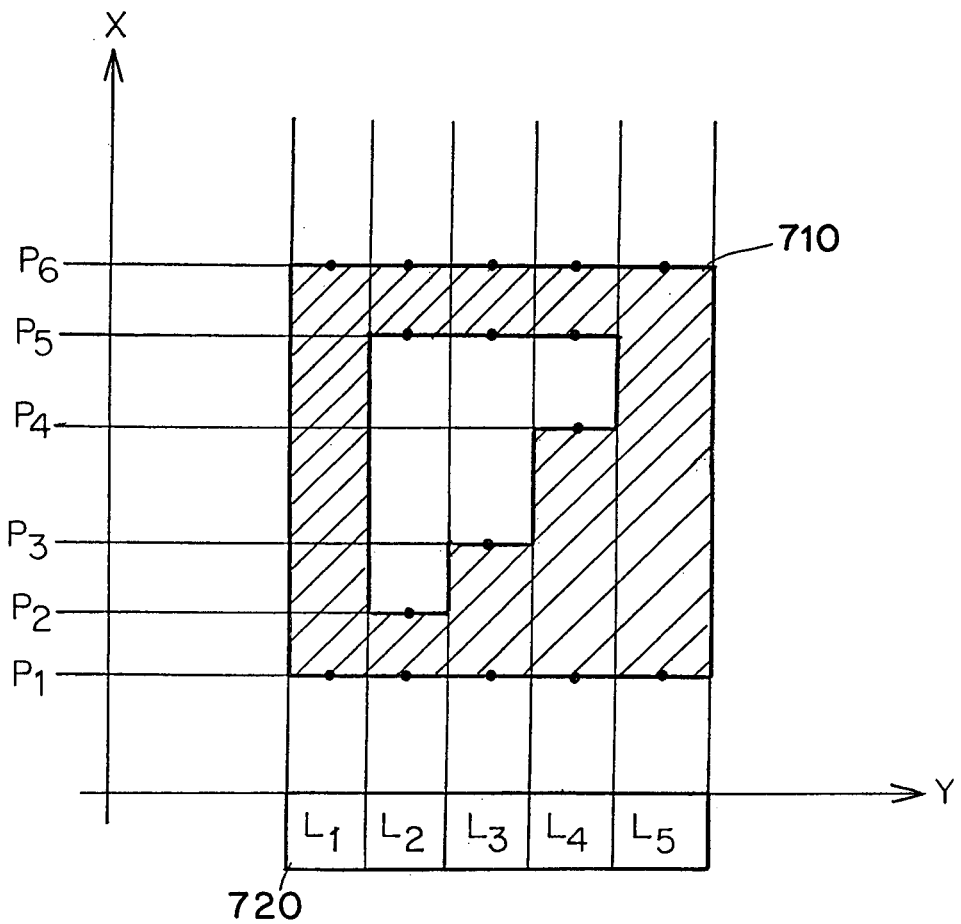
FIG. 7 is a schematic representation of a pattern of laser energy and an associated laser firing state matrix, according to some embodiments.
Figure 8:
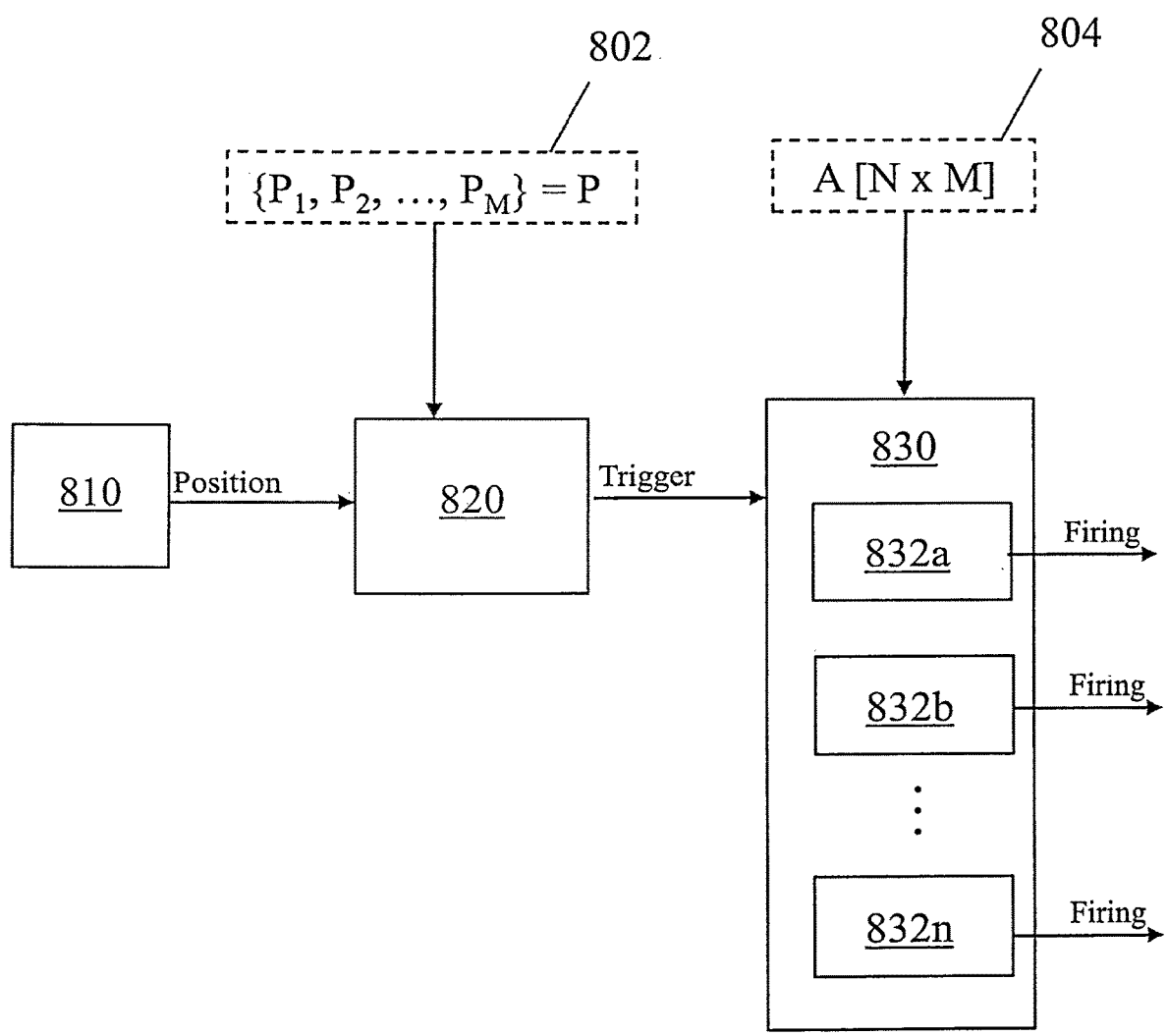
FIG. 8 is a schematic representation of a laser control system, according to some embodiments.

FIGS. 7 and 8 show another embodiment of a laser control system according to some aspects of the current disclosure. As shown in FIG. 7, a pattern of laser energy 510 may be formed by an array of laser energy pixels 720, and the pattern may be defined by a set of discrete laser trigger positions P of the array 720. For example, the array 720 may be moved along the x direction, and the positions P may correspond to distinct positions along the x direction at which a firing state of one or more of the laser energy pixels may change. The firing states at each position P may be defined by a laser firing state matrix 730. As illustrated, each column in the firing state matrix 730 may correspond to one position from the set of laser trigger positions, and each row in the matrix may provide the firing state for the lasers in the array 720 at each position. In this manner, each column of the matrix 730 may define a laser pattern for each respective position, and for a laser array having N lasers that is moved through M discrete positions, the matrix 730 may have dimensions N×M. Similar to the embodiment described above, it should be understood that this embodiment is not limited to any particular number of lasers in the array 730 and/or arrangement of lasers in the array.

Referring now to FIG. 8, the laser control system may include a first controller 820 configured to receive a position signal from one or more position sensors 810, as well as a first data set 802 containing a list of laser trigger positions P. The system further includes a second controller 830 configured to receive a second data set 804 containing a matrix A of firing states. In some embodiments, the first data set 802 may be stored on a first memory of the first controller 820, and the second data set 804 may be stored on a second memory of the second controller 830. The position sensor(s) 810 may be configured to detect a position of an array of laser energy pixels (e.g., array 720), for example, by detecting a position of an optics unit associated with the array 720. The first controller may compare the position signal with the list of laser trigger positions in the first data set 802, and if the first controller determines that the position signal corresponds to a laser trigger position from the list P, the first controller may generate and send a trigger signal to the second controller 830. Upon receiving the trigger signal the second controller may generate and send a plurality of firing signals via a plurality of outputs 832 according to a laser pattern (i.e., a column of laser firing states in matrix A) corresponding to the laser trigger position. As discussed above, in some embodiments, the list of laser trigger positions in the first data set 802 and the firing state matrix in the second data set 804 may be sorted such that each laser trigger position $P_i$ corresponds to the laser pattern of the $i^{th}$ column of the firing state matrix A. Accordingly, the firing state matrix may be configured as a shift register, such that upon receiving a trigger signal and sending a plurality of firing signals, the second controller 830 may automatically shift to the next laser pattern in the matrix (i.e., to the next column in the matrix A) and await a subsequent trigger signal. In this manner, the laser control system may sequentially step through each laser pattern corresponding to each laser trigger position throughout a process, such as a powder bed fusion process.

In certain embodiments, the firing state matrix A in the second data set 804 may be organized as a plurality of submatrices comprising one or more columns, and each submatrix may be triggered by a single laser trigger position $P_i$ in the first data set 802. For example, a submatrix may have dimensions N×m, where m is a number of predetermined firing events that are triggered at a particular laser trigger position; it should be appreciated that each submatrix may have different dimensions (i.e., a different value m). Such arrangements may allow for the laser control system to operate the laser array at a frequency higher than a frequency of the trigger signal, and/or may allow the laser array to operate with a lower frequency firing signal without losses in updating the laser array pattern.

Depending on the particular embodiment, a list of laser trigger positions may correspond to translation of a laser array along a single axis, along multiple axes, and/or a rotation of the laser array about one or more axes, and multiple positions sensors (e.g., multiple encoders) may be included to measure movement of the array along these various directions. The laser control systems described herein may be configured to select a particular position signal from the multiple position sensors and selectively activate a subset of lasers in the laser array based on a set of laser patterns corresponding to that particular position sensor. Moreover, in some embodiments, different position sensors may have different scales of accuracy. Accordingly, the laser control systems described herein may be configured to control the laser array based on different sets of firing signals (i.e., different sets of laser patterns) having varying scales of positional accuracy.

Moreover, as noted above, while certain embodiments described herein include a laser array that is controlled based on position feedback (e.g., based on a position signal from one or more position sensors), other arrangements, such as timing based feedback may be suitable. For example, laser trigger positions may be predetermined based on preplanned timings (i.e., based on a planned trajectory for a laser array). Thus, some embodiments may employ a first controller configured to receive a timing signal (e.g., from a system clock) and the first controller may determine a position of the laser array based on the timing signal. Accordingly, it should be understood that the current disclosure is not limited to laser control systems including position sensors and/or utilizing position-based feedback.

The above-described embodiments of the technology described herein can be implemented in any of numerous ways. For example, some aspects of the embodiments described herein may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC or FPGA, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computer may be embodied in any of a number of forms, such as a rack-mounted computer, a desktop computer, a laptop computer, or a tablet computer. Additionally, a computer may be embedded in a device not generally regarded as a computer but with suitable processing capabilities, including a Personal Digital Assistant (PDA), a smart phone or any other suitable portable or fixed electronic device.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible format.

Such computers may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, embodiments described herein may be embodied as a computer readable storage medium (or multiple computer readable media) (e.g., a computer memory, one or more floppy discs, compact discs (CD), optical discs, digital video disks (DVD), magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computers or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively, or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computer or other processor to implement various aspects of the present disclosure as discussed above. Additionally, it should be appreciated that according to one aspect of this embodiment, one or more computer programs that when executed perform methods of the present disclosure need not reside on a single computer or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. On the contrary, the present teachings encompass various alternatives, modifications, and equivalents, as will be appreciated by those of skill in the art. Accordingly, the foregoing description and drawings are by way of example only. For instance, aspects described in one embodiment may be combined in any manner with aspects described in other embodiments.

Also, the embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

The invention claimed is:

1. A method of controlling a laser array, the method comprising:
    generating a position signal based on a detection of a position of a laser array, the laser array comprising a plurality of laser energy sources;
    splitting the position signal into a split position signal;
    transmitting the split position signal to a plurality of laser control modules, the plurality of laser control modules configured to provide synchronized, position-based control of the plurality of laser energy sources; and
    selectively controlling operation of one or more laser energy sources of the plurality of laser energy sources using the plurality of laser control modules by using at least one processor in each laser control module to trigger the one or more laser energy sources based at least in part on the split position signal.

2. The method of claim 1, further comprising receiving the position signal with a first controller, and wherein selectively controlling operation of the one or more laser energy sources comprises:
    comparing the position signal to a list of laser trigger positions;
    generating a trigger signal based on the comparing of the position signal to the list of laser trigger positions;
    receiving the trigger signal with a second controller; and
    sending a firing signal to a subset of laser energy sources of the plurality of laser energy sources upon receiving the trigger signal.

3. The method of claim 2, further comprising:
    directing laser energy from the subset of laser energy sources towards a build surface of an additive manufacturing system.

4. The method of claim 3, wherein directing laser energy from the subset of laser energy sources towards the build surface of the additive manufacturing system comprises forming one or more parts on the build surface.

5. The method of claim 2, wherein the subset of laser energy sources is selected based on a first laser pattern corresponding to a first laser trigger position of the list of laser trigger positions.

6. The method of claim 2, further comprising transitioning to a second laser pattern corresponding to a second laser trigger position of the list of laser trigger positions after sending the firing signal.

7. The method of claim 6, further comprising sending a second firing signal to a second subset of laser energy sources upon receiving a second trigger signal.

8. The method of claim 7, wherein the second subset of laser energy sources is selected based on the second laser pattern, and the second trigger signal corresponds to the second laser trigger position.

9. The method of claim 2, wherein the position signal has a first frequency, and the trigger signal has a second frequency lower than the first frequency.

10. The method of claim 9, wherein the first frequency is between 1 MHz and 50MHz, and the second frequency is between 1 Hz and 1 MHz.

11. The method of claim 2, further comprising toggling a power setting of each laser energy source of the subset of laser energy sources upon receiving the firing signal.

12. The method of claim 11, wherein the power setting comprises at least one of a pulse width modulation setting, an on or off state, an analog power, and/or an on time.

13. The method of claim 2, further comprising:
    storing the list of laser trigger positions in a first memory of the first controller; and
    storing a plurality of laser patterns in a second memory of the second controller.

14. The method of claim 13, wherein each laser trigger position of the list of laser trigger positions corresponds to one or more laser patterns of the plurality of laser patterns.

15. The method of claim 14, wherein each laser pattern of the plurality of laser patterns comprises a firing state for each laser energy source of the plurality of laser energy sources.

16. The method of claim 2, wherein the second controller comprises a plurality of control units, and wherein each control unit is configured to control a subset of the plurality of laser energy sources.

17. The method of claim 16, further comprising splitting the trigger signal and delivering the trigger signal to each control unit of the plurality of control units.

18. The method of claim 1, wherein the detection of the position of the laser array comprises at least one of detecting the position of the laser array with a position sensor and/or estimating the position of the laser array based on a timing signal.

19. A part manufactured using the method of claim 1.

* * * * *